(12) United States Patent
Yang et al.

(10) Patent No.: US 9,872,208 B2
(45) Date of Patent: Jan. 16, 2018

(54) DATA FORWARDING METHOD AND DEVICE

(71) Applicant: China Academy of Telecommunications Technology, Beijing (CN)

(72) Inventors: Yi Yang, Beijing (CN); Dajun Zhang, Beijing (CN); Wei Bao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/420,665

(22) PCT Filed: Jul. 31, 2013

(86) PCT No.: PCT/CN2013/080453
§ 371 (c)(1),
(2) Date: Feb. 10, 2015

(87) PCT Pub. No.: WO2014/026543
PCT Pub. Date: Feb. 20, 2014

(65) Prior Publication Data
US 2015/0208283 A1    Jul. 23, 2015

(30) Foreign Application Priority Data

Aug. 15, 2012  (CN) .......................... 2012 1 0291254

(51) Int. Cl.
*H04W 36/00* (2009.01)
*H04W 36/04* (2009.01)
*H04L 12/801* (2013.01)

(52) U.S. Cl.
CPC ......... *H04W 36/0016* (2013.01); *H04L 47/34* (2013.01); *H04W 36/0055* (2013.01); *H04W 36/04* (2013.01)

(58) Field of Classification Search
CPC . H04W 12/02; H04W 36/00; H04W 36/0005; H04W 36/0011; H04W 36/0016;
(Continued)

(56) References Cited

U.S. PATENT DOCUMENTS 8,532,056 B2 *   9/2013   Ulupinar .............. H04B 7/2606
                                                      370/315
8,724,590 B2 *   5/2014   Bi ..................... H04W 36/0055
                                                      370/331
(Continued)

FOREIGN PATENT DOCUMENTS

CN         101400156 A      4/2009
CN         102158899 A      8/2011
(Continued)

OTHER PUBLICATIONS

3GPP TS 36.423 Release 8, LTE; X2 Application Protocol (X2AP), Nov. 2008, Version 8.3.0.*
(Continued)

*Primary Examiner* — Eric Nowlin
(74) *Attorney, Agent, or Firm* — Kilpatrick Townsend & Stockton LLP

(57) ABSTRACT

Disclosed are a data forwarding method and device, used for solving the problem that a communication interruption risk is generated when a user equipment (UE) is handed over in an existing hierarchical network. The method comprises: a source macro base station obtaining serial number sending state information of PDCP data packets, in uplink and downlink directions, of a local base station currently accessed by a UE, a control plane of the UE being connected to the source macro base station, and a user plane being connected to the local base station; and the source macro base station sending the serial number sending state information to a target base station that the UE is to be handed over to, and the target base station establishing a user plane (Continued)

connection to the UE according to the serial number sending state information.

16 Claims, 10 Drawing Sheets

(58) Field of Classification Search
CPC ......... H04W 36/0022; H04W 36/0033; H04W 36/0055; H04W 36/0072; H04W 36/0077; H04W 36/0083; H04W 36/02; H04W 36/023; H04W 36/04; H04W 36/08; H04W 36/12; H04W 36/14; H04W 36/18; H04W 36/24; H04W 36/30; H04W 80/20; H04W 72/04; H04W 72/0413; H04W 76/046; H04W 80/02; H04W 88/06; H04W 92/045; H04L 1/1642; H04L 1/1841; H04L 1/1874; H04L 47/34
See application file for complete search history.

(56) References Cited

U.S. PATENT DOCUMENTS

| | | | | |
|---|---|---|---|---|
| 8,755,355 B2* | 6/2014 | Guo | ............ | G01S 5/02 370/332 |
| 8,837,310 B2* | 9/2014 | Wang | ............ | H04J 3/06 370/252 |
| 8,867,428 B2* | 10/2014 | Ulupinar | ............ | H04B 7/2606 370/315 |
| 9,198,112 B2* | 11/2015 | Ulupinar | ............ | H04B 7/2606 |
| 9,247,382 B2* | 1/2016 | Guo | ............ | G01S 5/02 |
| 9,288,694 B2* | 3/2016 | Chiba | ............ | H04W 24/04 |
| 9,398,593 B2* | 7/2016 | Kubota | ............ | H04W 72/0486 |
| 9,420,501 B2* | 8/2016 | Lei | ............ | H04W 36/0055 |
| 9,467,912 B2* | 10/2016 | Zhang | ............ | H04W 36/0055 |
| 9,504,052 B2* | 11/2016 | Wu | ............ | H04W 72/085 |
| 9,526,031 B2* | 12/2016 | Siomina | ............ | H04W 24/08 |
| 9,544,822 B2* | 1/2017 | Dudda | ............ | H04W 36/0005 |
| 9,560,684 B2* | 1/2017 | Sivanesan | ............ | H04W 76/023 |
| 9,572,185 B2* | 2/2017 | Sivanesan | ............ | H04L 5/0055 |
| 9,578,671 B2* | 2/2017 | Blankenship | ............ | H04W 76/025 |
| 9,585,134 B2* | 2/2017 | Yamada | ............ | H04W 72/042 |
| 9,609,566 B2* | 3/2017 | Himayat | ............ | H04W 36/22 |
| 9,628,586 B2* | 4/2017 | Yi | ............ | H04L 69/04 |
| 9,668,178 B2* | 5/2017 | Vesterinen | ............ | H04W 36/0033 |
| 9,699,800 B2* | 7/2017 | Himayat | ............ | H04W 28/0278 |
| 9,706,418 B2* | 7/2017 | Decarreau | ............ | H04W 24/02 |
| 9,713,044 B2* | 7/2017 | Yamada | ............ | H04W 36/0072 |
| 9,730,120 B2* | 8/2017 | Zhu | ............ | H04W 36/0055 |
| 9,743,319 B2* | 8/2017 | Wu | ............ | H04W 36/0027 |
| 9,749,098 B2* | 8/2017 | Baek | ............ | H04L 5/00 |
| 9,763,283 B2* | 9/2017 | Jung | ............ | H04W 76/06 |
| 2008/0123660 A1* | 5/2008 | Sammour | ............ | H04L 47/10 370/395.21 |
| 2008/0167026 A1* | 7/2008 | Eckert | ............ | H04W 24/00 455/418 |
| 2008/0285492 A1* | 11/2008 | Vesterinen | ............ | H04W 8/082 370/310 |
| 2010/0260096 A1* | 10/2010 | Ulupinar | ............ | H04B 7/2606 370/315 |
| 2010/0260097 A1* | 10/2010 | Ulupinar | ............ | H04B 7/2606 370/315 |
| 2010/0260126 A1* | 10/2010 | Ulupinar | ............ | H04B 7/2606 370/329 |
| 2010/0322197 A1* | 12/2010 | Adjakple | ............ | H04B 7/155 370/332 |
| 2011/0176450 A1* | 7/2011 | Kubota | ............ | H04W 72/0486 370/252 |
| 2012/0099503 A1* | 4/2012 | Guo | ............ | G01S 5/02 370/312 |
| 2013/0088960 A1* | 4/2013 | Bi | ............ | H04L 1/1841 370/235 |
| 2013/0088979 A1* | 4/2013 | Bi | ............ | H04B 7/024 370/252 |
| 2013/0121171 A1* | 5/2013 | Wang | ............ | H04J 3/06 370/252 |
| 2013/0170474 A1* | 7/2013 | Bi | ............ | H04W 36/0055 370/332 |
| 2014/0016542 A1* | 1/2014 | Ulupinar | ............ | H04B 7/2606 370/315 |
| 2014/0198655 A1* | 7/2014 | Ishii | ............ | H04W 76/023 370/235 |
| 2014/0200016 A1* | 7/2014 | Siomina | ............ | H04W 24/08 455/450 |
| 2014/0269632 A1* | 9/2014 | Blankenship | ............ | H04W 76/025 370/336 |
| 2014/0295882 A1* | 10/2014 | Guo | ............ | G01S 5/02 455/456.1 |
| 2014/0307622 A1* | 10/2014 | Horn | ............ | H04L 45/245 370/328 |
| 2015/0085667 A1* | 3/2015 | Sivanesan | ............ | H04W 24/04 370/237 |
| 2015/0141015 A1* | 5/2015 | Zhang | ............ | H04W 36/0061 455/436 |
| 2015/0146623 A1* | 5/2015 | Bi | ............ | H04B 7/024 370/328 |
| 2015/0146662 A1* | 5/2015 | Bi | ............ | H04B 7/024 370/329 |
| 2015/0155919 A1* | 6/2015 | Bi | ............ | H04B 7/024 370/329 |
| 2015/0155922 A1* | 6/2015 | Bi | ............ | H04L 1/1841 370/329 |
| 2015/0173047 A1* | 6/2015 | Yamada | ............ | H04W 72/042 370/329 |
| 2015/0208235 A1* | 7/2015 | Ingale | ............ | H04W 12/04 455/411 |
| 2015/0230107 A1* | 8/2015 | Chiba | ............ | H04W 24/04 370/225 |
| 2015/0264562 A1* | 9/2015 | Wu | ............ | H04W 12/04 380/270 |
| 2015/0264609 A1* | 9/2015 | Zhang | ............ | H04W 36/0055 455/436 |
| 2015/0271836 A1* | 9/2015 | Damnjanovic | ... | H04W 72/0413 370/329 |
| 2015/0282239 A1* | 10/2015 | Han | ............ | H04W 76/025 370/329 |
| 2015/0312811 A1* | 10/2015 | Lei | ............ | H04W 36/0055 370/331 |
| 2015/0326456 A1* | 11/2015 | Dudda | ............ | H04L 43/062 370/252 |
| 2015/0350969 A1* | 12/2015 | Dudda | ............ | H04W 36/0005 370/331 |
| 2015/0373759 A1* | 12/2015 | Wang | ............ | H04B 7/155 370/329 |
| 2016/0007255 A1* | 1/2016 | Sharma | ............ | H04W 36/08 370/331 |
| 2016/0029213 A1* | 1/2016 | Rajadurai | ............ | H04W 12/04 380/283 |
| 2016/0029283 A1* | 1/2016 | Wang | ............ | H04B 7/155 370/329 |
| 2016/0029374 A1* | 1/2016 | Wang | ............ | H04B 7/155 370/329 |
| 2016/0029421 A1* | 1/2016 | Wang | ............ | H04B 7/155 370/329 |
| 2016/0044506 A1* | 2/2016 | Rajadurai | ............ | H04W 12/04 455/410 |
| 2016/0050604 A1* | 2/2016 | Lee | ............ | H04W 36/22 370/331 |
| 2016/0057585 A1* | 2/2016 | Horn | ............ | H04W 80/02 370/312 |
| 2016/0057658 A1* | 2/2016 | Horn | ............ | H04L 43/16 370/236 |
| 2016/0057672 A1* | 2/2016 | Park | ............ | H04W 36/08 370/331 |
| 2016/0057687 A1* | 2/2016 | Horn | ............ | H04W 24/10 370/331 |
| 2016/0065439 A1* | 3/2016 | Bi | ............ | H04L 1/1841 370/252 |
| 2016/0113058 A1* | 4/2016 | Jung | ............ | H04B 7/2612 370/328 |

(56) References Cited

U.S. PATENT DOCUMENTS

| | | | | |
|---|---|---|---|---|
| 2016/0119826 A1* | 4/2016 | Huh | ............... | H04W 76/025 370/332 |
| 2016/0119831 A1* | 4/2016 | Deng | ............... | H04W 36/0055 455/436 |
| 2016/0119840 A1* | 4/2016 | Loehr | ............... | H04W 72/0446 370/331 |
| 2016/0119939 A1* | 4/2016 | Himayat | ............... | H04W 28/0278 370/329 |
| 2016/0135103 A1* | 5/2016 | Lee | ............... | H04W 28/08 455/444 |
| 2016/0156548 A1* | 6/2016 | Pazhyannur | ............... | H04W 28/08 370/338 |
| 2016/0157117 A1* | 6/2016 | Pan | ............... | H04W 24/10 370/252 |
| 2016/0164793 A1* | 6/2016 | Basu Mallick | ............... | H04W 28/06 370/235 |
| 2016/0174111 A1* | 6/2016 | Zhu | ............... | H04W 36/0033 370/331 |
| 2016/0183103 A1* | 6/2016 | Saily | ............... | H04W 36/02 370/216 |
| 2016/0183158 A1* | 6/2016 | Decarreau | ............... | H04W 36/02 370/328 |
| 2016/0205547 A1* | 7/2016 | Rajadurai | ............... | H04W 12/04 726/4 |
| 2016/0212662 A1* | 7/2016 | Lee | ............... | H04W 76/064 |
| 2016/0212753 A1* | 7/2016 | Wu | ............... | H04W 72/085 |
| 2016/0212790 A1* | 7/2016 | Fujishiro | ............... | H04L 45/24 |
| 2016/0219473 A1* | 7/2016 | Teyeb | ............... | H04W 36/0088 |
| 2016/0219603 A1* | 7/2016 | Fujishiro | ............... | H04W 72/085 |
| 2016/0219604 A1* | 7/2016 | Fujishiro | ............... | H04W 72/085 |
| 2016/0234714 A1* | 8/2016 | Basu Mallick | ............... | H04W 28/085 |
| 2016/0234726 A1* | 8/2016 | Nuggehalli | ............... | H04W 36/0022 |
| 2016/0242092 A1* | 8/2016 | Rosa | ............... | H04W 36/0016 |
| 2016/0249259 A1* | 8/2016 | Park | ............... | H04W 36/00 |
| 2016/0269943 A1* | 9/2016 | Ji | ............... | H04W 36/0022 |
| 2016/0315868 A1* | 10/2016 | Zhang | ............... | H04L 47/34 |
| 2016/0337909 A1* | 11/2016 | Cai | ............... | H04W 36/0033 |
| 2016/0337914 A1* | 11/2016 | Hoffmann | ............... | H04W 36/0083 |
| 2016/0338074 A1* | 11/2016 | Chou | ............... | H04W 76/046 |
| 2016/0353337 A1* | 12/2016 | Zhu | ............... | H04W 36/0055 |
| 2017/0013650 A1* | 1/2017 | Fujishiro | ............... | H04W 76/04 |
| 2017/0055174 A1* | 2/2017 | Siomina | ............... | H04W 24/08 |
| 2017/0094561 A1* | 3/2017 | Horneman | ............... | H04W 28/12 |
| 2017/0171905 A1* | 6/2017 | Uchino | ............... | H04W 76/045 |
| 2017/0181044 A1* | 6/2017 | Wen | ............... | H04W 36/0027 |
| 2017/0245184 A1* | 8/2017 | Nagesh Shetigar | ............... | H04J 11/00 |
| 2017/0272364 A1* | 9/2017 | Ishii | ............... | H04W 76/023 |

FOREIGN PATENT DOCUMENTS

| | | | |
|---|---|---|---|
| CN | 102348244 A | 2/2012 | |
| CN | 102833802 A | 12/2012 | |
| EP | 2442610 A1 | 4/2012 | |
| WO | 2008140028 A1 | 11/2008 | |
| WO | 2011137775 A1 | 11/2011 | |
| WO | 2011149316 A2 | 12/2011 | |
| WO | WO 2012166975 A1 * | 12/2012 | ......... H04W 76/023 |

OTHER PUBLICATIONS

Balachandran et al., Seamless Macro-Cell Anchored Radio Transmission for Enhanced Downlink Performance in Heterogeneous Networks, 2011 Proceedings of 20th International Conference on Computer Communication sand Networks (ICCCN), Aug. 30, 2011, IEEE.*
International Search Report for PCT/CN2013/080453.
The Extended European Search Report dated Aug. 6, 2015 in the EP counterpart application (13829816.1).

* cited by examiner

DATA FORWARDING METHOD AND DEVICE

This application is a US National Stage of International Application No. PCT/CN2013/080453, filed on Jul. 31, 2013, designating the United States and claiming the priority to Chinese Patent Application No. 201210291254.4, filed with the Chinese Patent Office on Aug. 15, 2012 and entitled "Method and device for forwarding data", the content of which is hereby incorporated by reference in its entirety.

FIELD

The present invention relates to the field of communications and particularly to method and device for forwarding data.

BACKGROUND

FIG. 1 illustrates the network architecture of an Evolved Universal Terrestrial Radio Access Network (E-UTRAN), which is consisted of evolved Node Bs (eNBs). There is a control plane interface (X2-C interface) between adjacent eNBs, and when a User Equipment (UE) is handed over, a source eNB and a target eNB may further create a user plane interface (X2-U interface) for the UE to forward data.

A Mobility Management Entity (MME) is connected with an eNB via an S1-MME interface; and the eNB functions as an access network and communicates with the UE via an air interface. For each UE attached to the network, there is an MME serving the UE, which is referred as to a serving MME of the UE. The S1-MME interface provides the UE with a control plane service, including mobility management and bearer management functions.

A Serving Gateway (S-GW) is connected with an eNB via an S1-U interface. For each UE attached to the network, there is an S-GW serving the UE, which is referred to as a serving SGW of the UE. The S1-U interface provides the UE with a user plane service, and user plane data of the UE is transmitted between the S-GW and the eNB by a General Packet Radio Service (GPRS) Tunneling Protocol (GTP) of the S1-U interface.

In the network architecture of the E-UTRAN, the UE is connected with the same eNB in both the control plane and the user plane of the air interface. If the UE needs to be handed over from the source eNB to the target eNB, then the source eNB needs to configure the UE with measurement configuration information, and the source eNB makes a handover decision according to a measurement result reported by the UE. If the source eNB decides a handover to be performed, then it transmits a Handover Request message to the target eNB; the target eNB performs an admission decision according to Qualities of Service (QoS) of bearers to be admitted and other information, and when allowed admission of the UE is decided, the target eNB performs underlying configuration to prepare for the handover and returns to the source eNB a Handover Request Acknowledge message including a Radio Resource Control (RRC) container which contains a Handover Command to trigger the UE to be handed over, the bearer accepted by the target eNB to forward uplink/downlink data, and a transport layer address and a Tunnel Endpoint Identifier (TEID) of a forward tunnel; after the source eNB forwards the Handover Command to the UE, the UE stops the data from being received and transmitted at the source eNB; and the source eNB transmits to the target eNB, sequence number status information of the currently transmitted data (e.g., the sequence number of a downlink data packet which is transmitted unsuccessfully, the first sequence number which can be allocated by the target eNB, etc.), which further includes the identifier allocated previously by the protocol for the UE (e.g., an X2AP ID, an X2 interface application layer identifier, etc.) so that the target eNB can identify the UE to which the received sequence number is directed. The source eNB can further transmit a downlink data packet, which is received from a core network but has not been transmitted to the UE, to the target eNB so that the target eNB transmits it to the UE. The source eNB can further transmit an uplink data packet of the UE, received via the air interface, with a inconsecutive sequence number, to the target eNB so that the target eNB transmits the data packet with a consecutive sequence number to the core network upon reception of the missing data packet retransmitted by the UE; the UE transmits a preamble to the target eNB for uplink synchronization with the target eNB, the target eNB allocates an uplink resource, and a timing advance of the UE, for the UE, and the UE returns a Handover Complete message to the target eNB, so that the data can be transmitted and received between them; and thereafter the target eNB transmits a Path Switch Request to the MME, the MME further transmits a user plane transport layer address and a downlink GTP tunnel endpoint identifier, allocated by the target eNB for an Evolved Packet System (EPS) bearer of the respective UE, to the SGW, the SGW switches a downlink data transmission path of the UE to the target eNB, the SGW returns a Bearer Modify Response to the MME, and the MME switches both the user plane and the control plane of the UE to the target eNB after returning a Path Switch Response to the target eNB, that is, the UE sets up user plane and control plane radio bearers with the target eNB at a Uu interface, thus completing the path switching procedure, so that the source eNB can release the relevant resource allocated for the UE.

In the existing layered network as illustrated in FIG. 2, a macro cell provides underlying coverage, and a local cell provides hotspot coverage, and there is a data/signaling interface (a wired/wireless interface) between the local cell and the macro cell, and the UE can operate while being served by a macro eNB or a local eNB. Due to small coverage of by the cell controlled by the local eNB and a small number of UEs served by the cell controlled by the local eNB, the UE connected with the local eNB tends to be provided with a higher quality of service, e.g., a higher traffic rate, a link with a higher quality, etc. However due to a large number of local eNBs with small coverage, the UE being moved may be switched frequently between the cell controlled by the macro eNB and the cell controlled by the local eNB. The handover frequency and handover times may be increased significantly, thus resulting in a greater risk of interrupted communication of the UE being handed over.

SUMMARY

The invention provides a method and device for forwarding data so as to address the problem of a risk of interrupted communication of the UE being handed over in the existing layered network.

The technical solutions according to embodiments of the invention are as follows:

A method for forwarding data includes:

obtaining, by a source macro base station, sequence number transmission status information of uplink and downlink Packet Data Convergence Protocol (PDCP) data packets of a local base station currently accessed by a User Equipment (UE), wherein a control plane of the UE is connected with the source macro base station, and a user plane of the UE is connected with the local base station; and transmitting, by the source macro base station, the sequence number transmission status information to a target base station to which the UE is to be handed over, so that the target base station sets up a user plane connection with the UE according to the sequence number transmission status information.

A method for forwarding data includes:

receiving, by a local base station, a Handover Indication message transmitted by a source macro base station to instruct a User Equipment (UE) to be handed over to a target base station, wherein a control plane of the UE is connected with the source macro base station, and a user plane of the UE is connected with the local base station; and transmitting, by the local base station, acknowledgement information of successful transmission of Packet Data Convergence Protocol (PDCP) data packets to the source macro base station, so that the source macro base station obtains and transmits to the target base station, sequence number transmission status information of uplink and downlink PDCP data packets of the UE from data packets, for which no acknowledgement indicator of successful transmission is available from the local base station, among locally stored PDCP data packets according to the acknowledgement information of successful transmission.

A method for forwarding data includes:

receiving, by a local base station, a Handover Indication message or a Data Forward Command message transmitted by a source macro base station to instruct a User Equipment (UE) to be handed over to a target base station, wherein a control plane of the UE is connected with the source macro base station, and a user plane of the UE is connected with the local base station; and transmitting, by the local base station, a sequence number status report to the source macro base station, so that the source macro base station obtains and transmits to the target base station, sequence number transmission status information of uplink and downlink Packet Data Convergence Protocol (PDCP) data packets of the UE from the sequence number status report.

A network-side device includes:

an obtaining unit configured to obtain sequence number transmission status information of uplink and downlink Packet Data Convergence Protocol (PDCP) data packets of a local base station currently accessed by a User Equipment (UE), wherein a control plane of the UE is connected with the network-side device, and a user plane is connected with the local base station; and a processing unit configured to transmit the sequence number transmission status information to a target base station to which the UE is to be handed over, so that the target base station sets up a user plane connection with the UE according to the sequence number transmission status information.

A network-side device includes:

a receiving unit configured to receive a Handover Indication message transmitted by a source macro base station to instruct a User Equipment (UE) to be handed over to a target base station, wherein a control plane of the UE is connected with the source macro base station, and a user plane of the UE is connected with the network-side device; and a transmitting unit configured to transmit acknowledgement information of successful transmission of Packet Data Convergence Protocol (PDCP) data packets to the source macro base station so that the source macro base station obtains, and transmits to the target base station, sequence number transmission status information of uplink and downlink PDCP data packets of the UE from data packets, for which no acknowledgement indicator of successful transmission is available from the local base station, among locally stored PDCP data packets according to the acknowledgement information of successful transmission.

A network-side device includes:

a receiving unit configured to receive a Handover Indication message or a Data Forward Command message transmitted by a source macro base station to instruct a User Equipment (UE) to be handed over to a target base station, wherein a control plane of the UE is connected with the source macro base station, and a user plane of the UE is connected with the network-side device; and a transmitting unit configured to transmit a sequence number status report to the source macro base station so that the source macro base station obtains, and transmits to the target base station, sequence number transmission status information of uplink and downlink Packet Data Convergence Protocol (PDCP) data packets of the UE from the sequence number status report.

With the technical solutions above, in the embodiments of the invention, the control plane of a UE is connected with a source macro base station, and the user plane of the UE is connected with a local base station, so that a risk of interrupted communication of the UE being handed over in the existing layered network can be lowered effectively. Moreover the source macro base station obtains sequence number transmission status information of uplink and downlink PDCP data packets of the local base station currently accessed by the UE and transmits the sequence number transmission status information to a target base station to which the UE is to be handed over, and the target base station sets up a user plane connection with the UE according to the sequence number transmission status data, so that the user plane connection of the UE can be switched from the local base station to the adjacent target base station and data can be avoided from being lost during the handover.

DETAILED DESCRIPTION OF THE EMBODIMENTS

Figure 1:
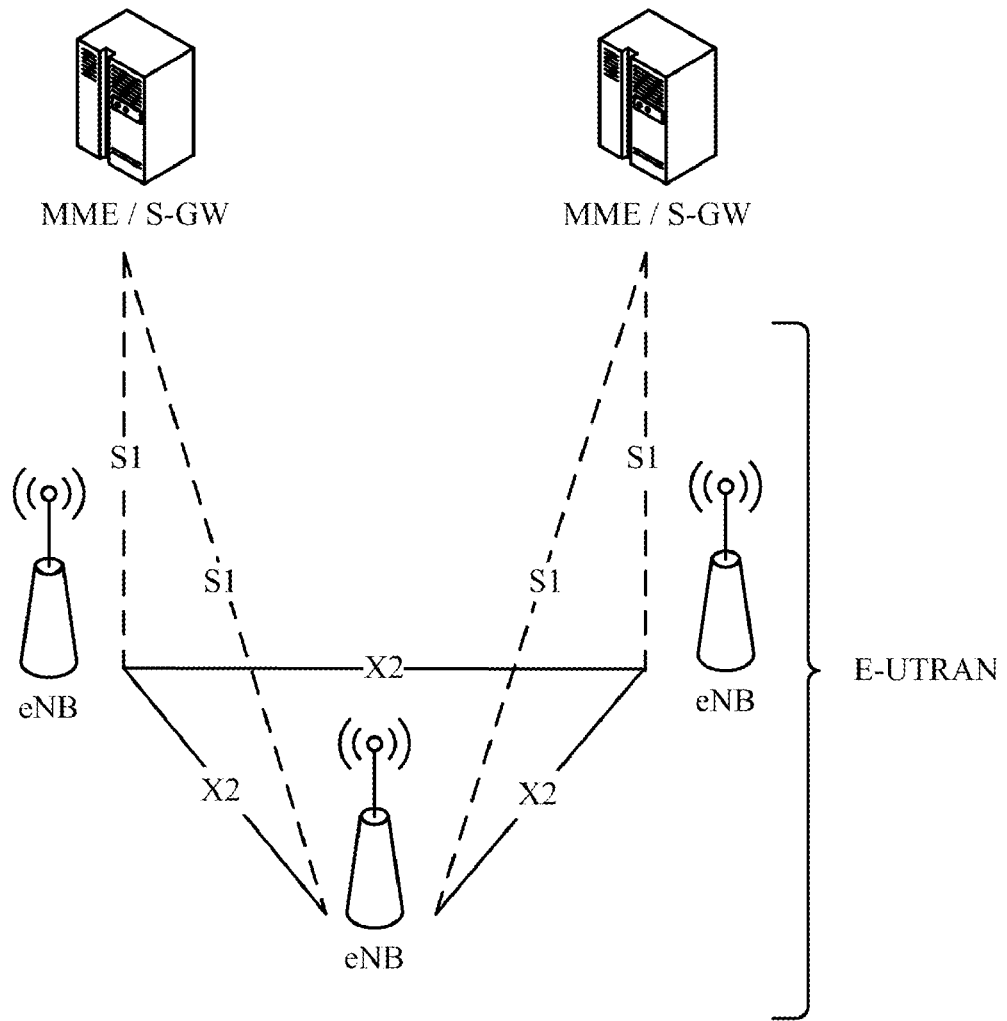
FIG. 1 is a schematic network architectural diagram of the E-UTRAN in the prior art.
Figure 2:
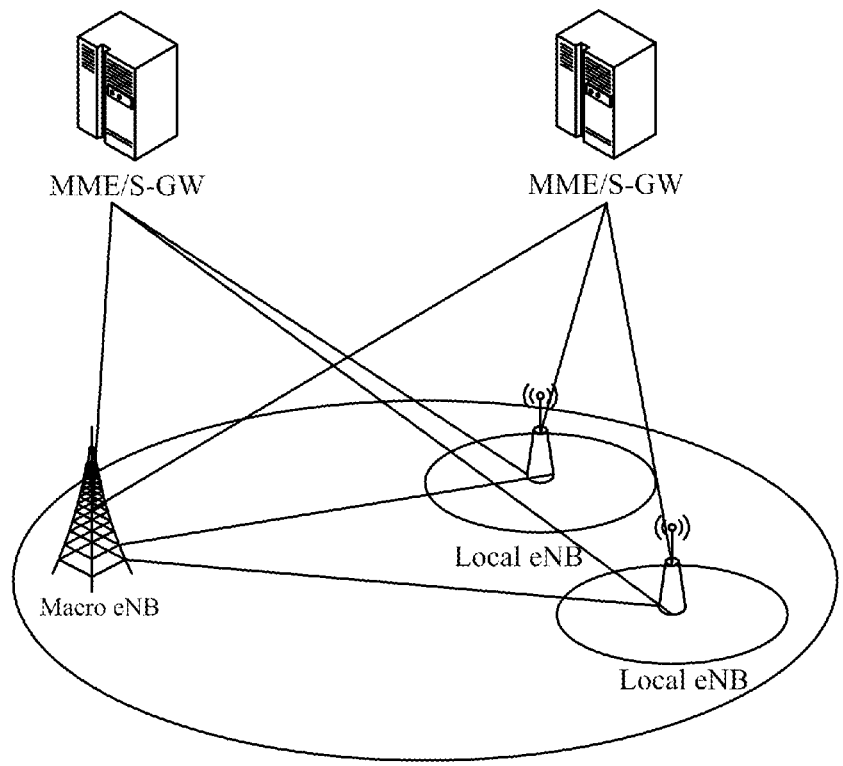
FIG. 2 is a schematic architectural diagram of the layered network in the prior art.
Figure 3:
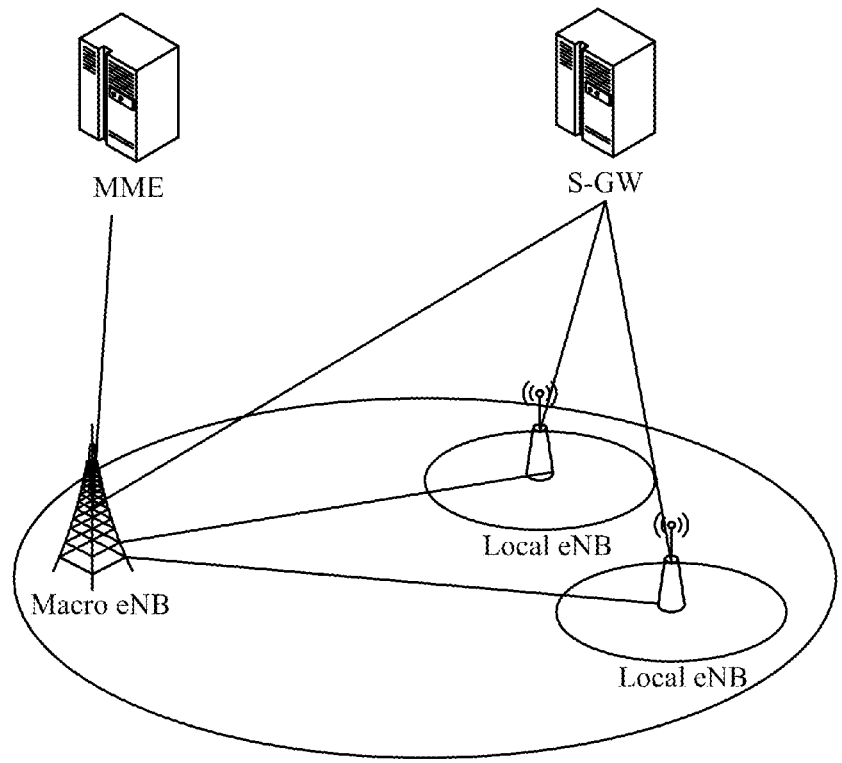
FIG. 3 is a schematic diagram of a network architecture in which the user plane is separated from the control plane according to an embodiment of the invention.

In order to lower the frequency at which a UE is handed over between cells, a scheme of network deployment, in which the user plane is separated from the control plane, is introduced. As illustrated in FIG. 3, a macro eNB provides underlying coverage, and a local eNB provides hotspot coverage. In this scheme, when the UE is located in an area covered by only a cell of the macro eNB, both the control plane and the user plane of the UE are connected with the source macro eNB; and when the UE is moved to an area covered by both the cell of the macro eNB and a cell of the local eNB, all or a part of user plane bearers of the UE are switched to the local eNB for a higher traffic transmission rate; and the control plane connections are still maintained under the macro eNB, thus preventing a dropped call of the UE due to a failure in the control plane connection handover.

Particularly the macro eNB can be an LTE macro eNB; and the local eNB can be embodied in numerous forms, e.g., a pico eNB, a home eNB, a relay device, etc., of the LTE.

Figure 4:
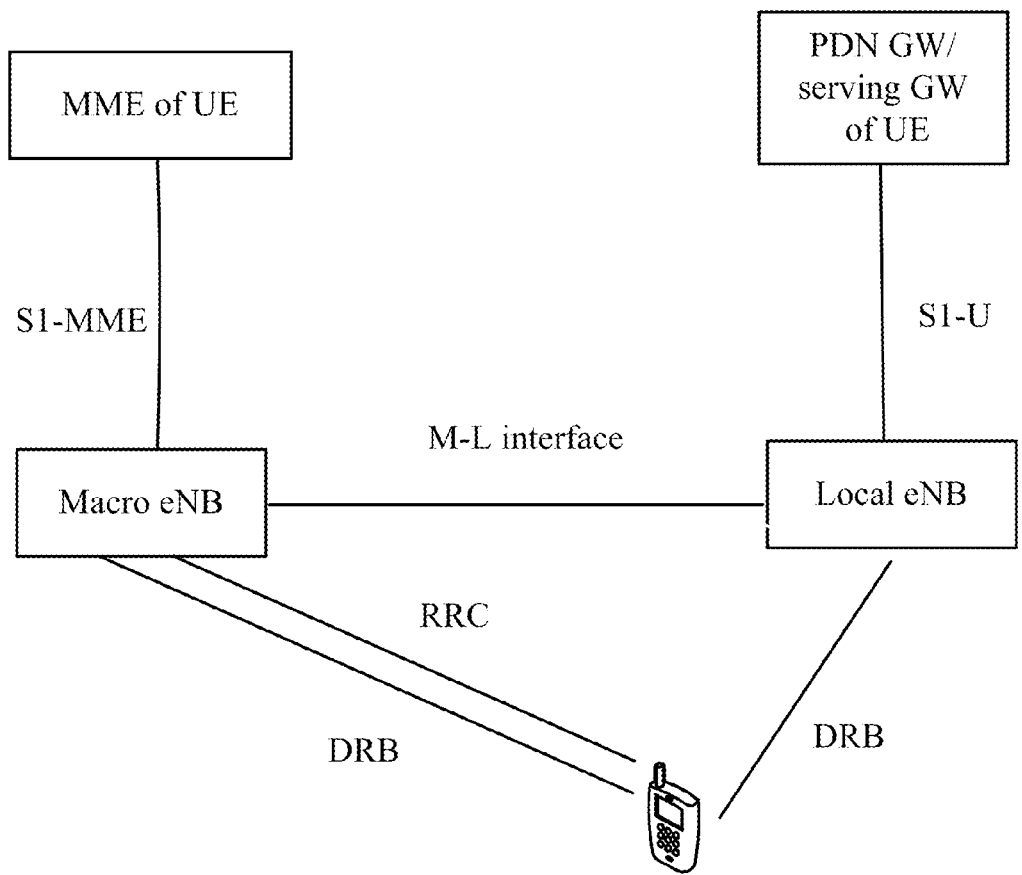
FIG. 4 is a first network architecture in which the control plane is separated from the user plane according to an embodiment of the invention.

In the event that the user plane of the UE is separated from the control plane, the UE is connected with the two eNBs. FIG. 4 illustrates a first network architecture in which the control plane is separated from the user plane, where a Signaling Radio Bearer (SRB) of the UE is maintained at the macro eNB, and the Packet Data Convergence Protocol (PDCP)/Radio Link Control (RLC)/Media Access Control (MAC)/Physical (PHY) layers of all or a part of the user plane connections are maintained at the local eNB, and the M-L interface represents a logical interface, between the macro eNB and the local eNB, which can be newly defined or can be an existing X2 interface. Uplink data of the UE arriving at the local eNB is transmitted directly to the SGW, and downlink data of the UE arriving at the SGW is transmitted directly to the local eNB, thus alleviating a burden of the macro eNB to process data packets of the UE.

Figure 5:
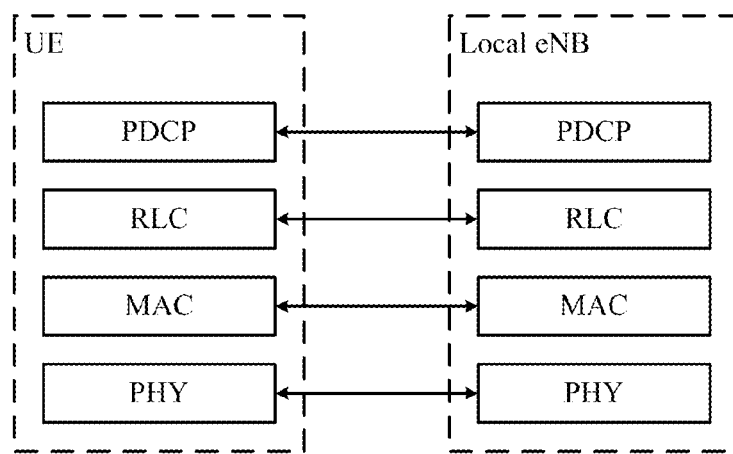
FIG. 5 is a schematic diagram of a user plane protocol stack in the first network architecture according to the embodiment of the invention.

In this architecture, the macro eNB is provided with the entire user plane and control plane protocol stacks, i.e., a user plane protocol stack and a control plane protocol stack, which are counterparts of the UE. The local eNB enables the UE to transmit user plane data in the entire user plane protocol stack, and FIG. 5 illustrates a schematic diagram of the user plane protocol stack between the UE and the local eNB.

Figure 6:
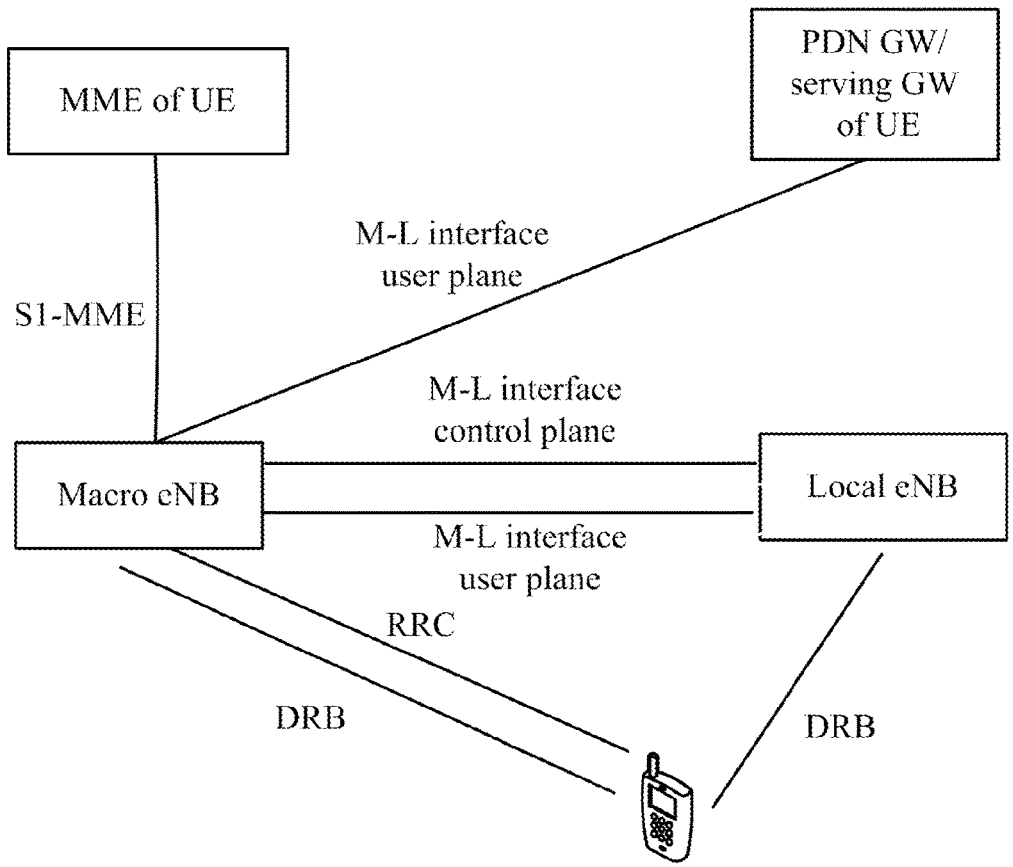
FIG. 6 is a second network architecture in which the control plane is separated from the user plane according to an embodiment of the invention.

FIG. 6 illustrates a second network architecture in which the control plane is separated from the user plane, where an SRB of the UE is maintained at the macro eNB, and the PDCP/RLC/MAC/PHY layers of all or a part of user plane connections (i.e., Data Radio Bearers (DRBs)) are maintained at the local eNB, and the M-L interface represents a logical interface, between the macro eNB and the local eNB, which can be newly defined or can be an existing X2 interface. Both uplink and downlink data of the UE is transmitted to the UE or the SGW through the macro eNB.

Figure 7:
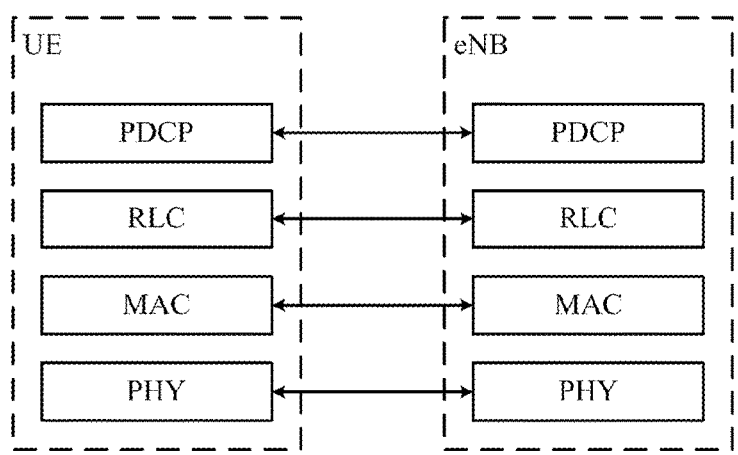
FIG. 7 is a schematic diagram of a user plane protocol stack in the second network architecture according to the embodiment of the invention.
Figure 8:
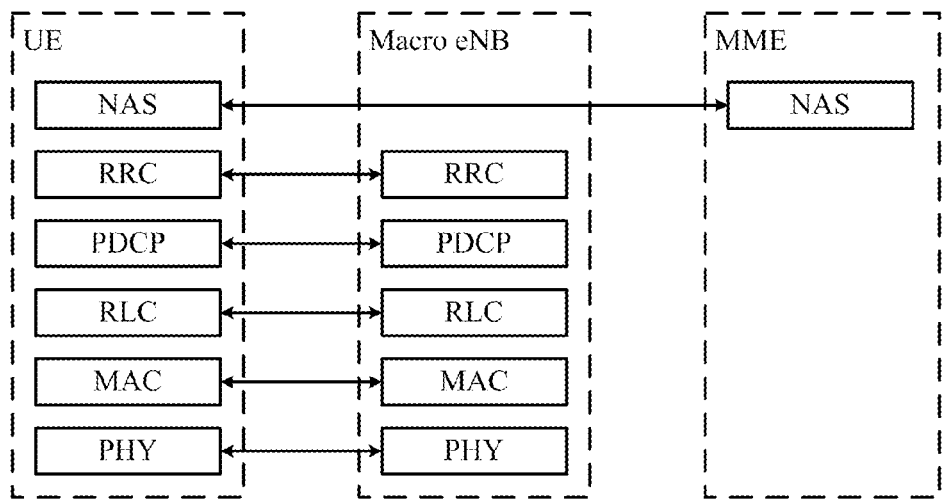
FIG. 8 is a schematic diagram of a control plane protocol stack in the second network architecture according to the embodiment of the invention.

In this architecture, FIG. 7 illustrates the user plane protocol stack of the UE in which the PDCP layer is deployed at the macro eNB instead of the local eNB, and FIG. 8 illustrates the control plane protocol stack of the UE.

In the network architecture where the user plane is separated from the control plane, the UE is connected with both the macro eNB and the local eNB to be provided respectively with control plane and user plane connections. Particularly a part of user plane bearers of the UE are separated from the control plane, or all of the user plane bearers of the UE are separated from the control plane.

In the event that the user plane is separated from the control plane, the macro eNB is provided with the entire user plane and control plane protocol stacks, i.e., a user plane protocol stack and a control plane protocol stack, which are counterparts of the UE. The local eNB enables the UE to transmit user plane data in the entire user plane protocol stack.

In the layered network architecture where the user plane is separated from the control plane, when the UE moves from the local eNB to the coverage area of the adjacent macro eNB, the UE needs to be handed over between the local eNB and the adjacent macro eNB. Since the UE sets up the user plane connection only with the local eNB, and the control plane connection is still maintained at the source macro eNB, there is no direct control plane interface (i.e., X2-C interface) between the local eNB and the adjacent macro eNB so that no data forward tunnel can be set up directly with the adjacent macro eNB, thus potentially resulting in a loss of data of the UE being handed over. In view of this, embodiments of the invention provide a method for forwarding data in a scenario where a bearer is separated so as to avoid a loss of data of the UE being handed over from a local eNB under a source macro eNB to an adjacent target eNB.

Preferred embodiments of the invention will be described below in details with reference to the drawings.

In the following embodiments, a target eNB can be a macro eNB providing underlying coverage in another layered network adjacent to a source macro eNB or can be a general eNB, in another non-layered network, for which a user plane connection and a control plane connection need to be set up with a UE.

Figure 9:
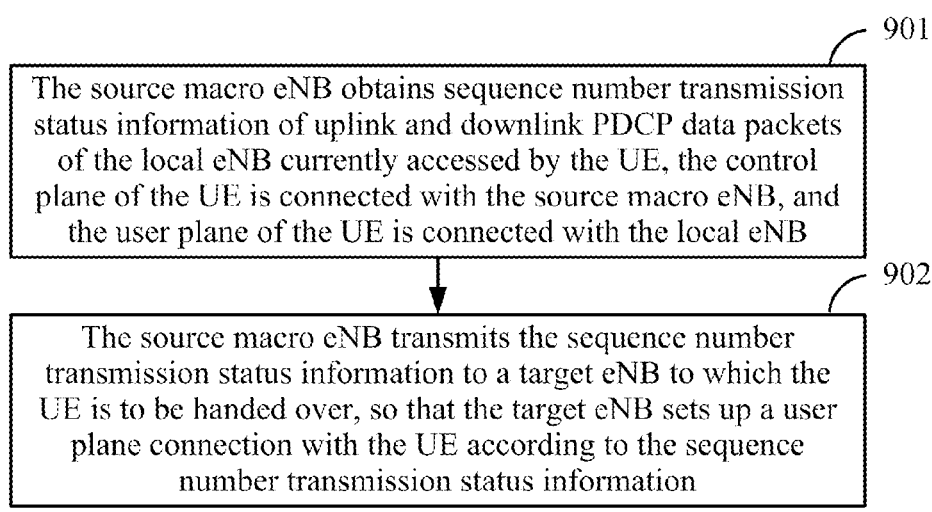
FIG. 9 is a flow chart of a method for forwarding data according to a first embodiment of the invention.

In a first embodiment of the invention, as illustrated in FIG. 9, a detailed process of forwarding data by a source macro eNB when the source macro eNB controls a UE to be handed over from a local eNB under the source macro eNB to an adjacent target eNB is as follows:

Operation 901, the source macro eNB obtains sequence number transmission status information of uplink and downlink PDCP data packets of the local eNB currently accessed by the UE, where the control plane of the UE is connected with the source macro eNB, and the user plane of the UE is connected with the local eNB.

Operation 902, the source macro eNB transmits the sequence number transmission status information to a target eNB to which the UE is to be handed over, so that the target eNB sets up a user plane connection with the UE according to the sequence number transmission status information.

Particularly the source macro eNB obtains the sequence number transmission status information from a sequence number status report transmitted by the local eNB; or the source macro eNB obtains the sequence number transmission status information from data packets, for which no acknowledgement indicator of successful transmission is available from the local eNB, among locally stored PDCP data packets.

In a particular implementation, the source macro eNB receives the sequence number status report transmitted by the local eNB after transmitting a Data Forward Command message to the local eNB, and then the source macro eNB obtains the sequence number transmission status information from the sequence number status report.

Preferably after the source macro eNB transmits the Data Forward Command message to the local eNB, the local eNB stops uplink and downlink data of the UE from being received and transmitted.

Particularly the Data Forward Command message carries at least an identifier of bearer for which data needs to be forwarded and additionally the identifier of the UE, a transport layer address and a TEID of a forward tunnel, etc. Preferably the TEID is a GTP tunnel endpoint identifier.

In another implementation, the source macro eNB receives the sequence number status report transmitted by the local eNB after transmitting a Handover Indication message to the local eNB, and then the source macro eNB obtains the sequence number transmission status information from the sequence number status report.

Particularly the handover indication message includes the identifier of the UE.

In another implementation, the source macro eNB transmits a Handover Indication message to the local eNB and receives acknowledgement information of successful transmission of PDCP data packets returned by the local eNB and then obtains the sequence number transmission status information from the data packets, for which no acknowledgement indicator of successful transmission is available from the local eNB, among locally stored PDCP data packets.

Particularly after the source macro eNB transmits the Handover Indication message to the local eNB, the local eNB stops to receive and transmit uplink and downlink data of the UE.

Figure 10:
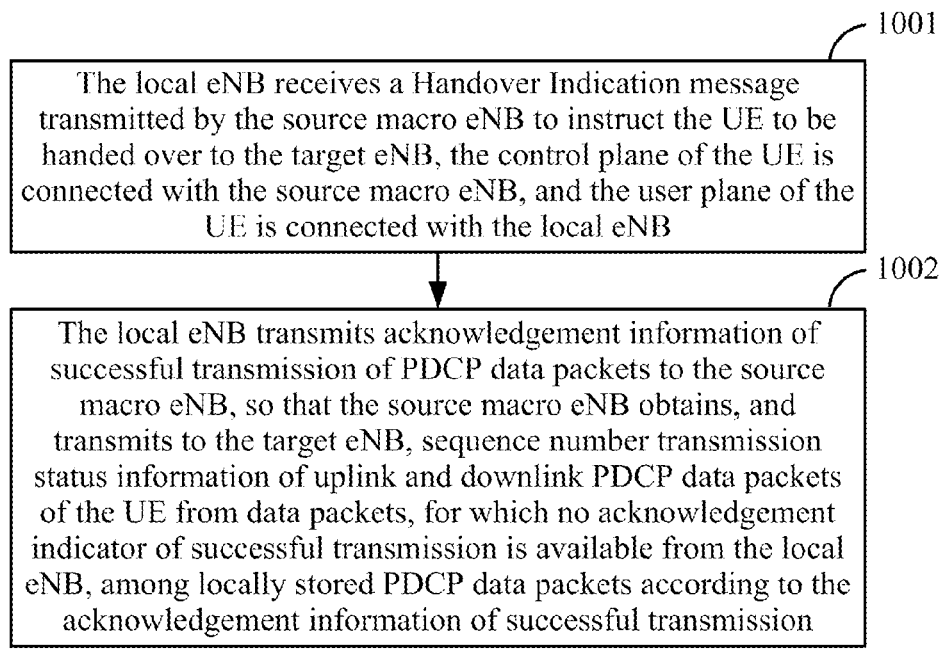
FIG. 10 is a flow chart of a method for forwarding data according to a second embodiment of the invention.

In a second embodiment of the invention, as illustrated in FIG. 10, a detailed process of forwarding data by a local eNB under a source macro eNB when the source macro eNB controls a UE to be handed over from the local eNB to an adjacent target eNB is as follows:

Operation 1001, the local eNB receives a Handover Indication message transmitted by the source macro eNB to instruct the UE to be handed over to the target eNB, where the control plane of the UE is connected with the source macro eNB, and the user plane of the UE is connected with the local eNB.

Particularly the handover indication message includes the identifier of the UE.

Operation 1002, the local eNB transmits acknowledgment information of successful transmission of PDCP data packets to the source macro eNB, so that the source macro eNB obtains, and transmits to the target eNB, sequence number transmission status information of uplink and downlink PDCP data packets of the UE from data packets, for which no acknowledge indicator of successful transmission is available from the local eNB, among locally stored PDCP data packets according to the acknowledgement information of successful transmission.

Particularly the local eNB stops uplink and downlink data of the UE from being received and transmitted upon reception of the Handover Indication message and then transmits the acknowledge information of successful transmission of the PDCP data packets to the source macro eNB.

Figure 11:
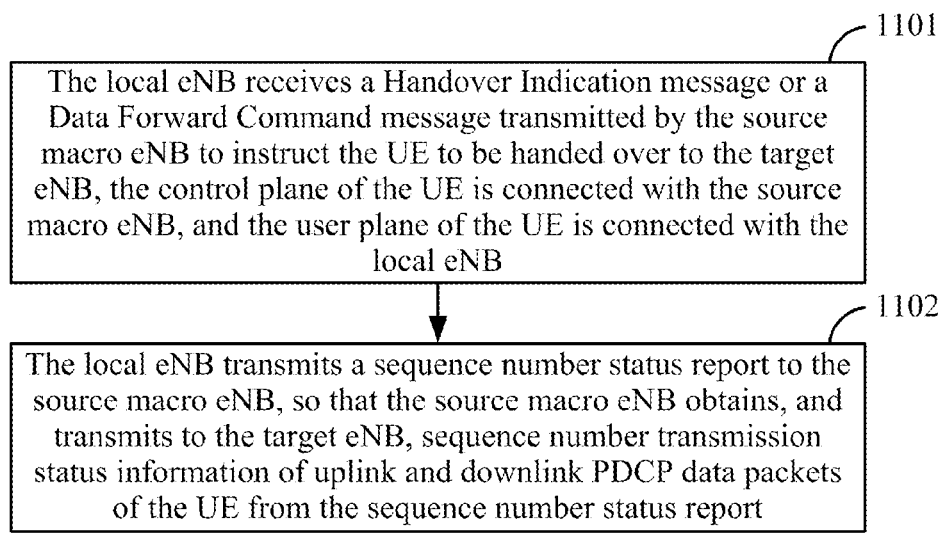
FIG. 11 is a flow chart of a method for forwarding data according to a third embodiment of the invention.

In a third embodiment of the invention, as illustrated in FIG. 11, a detailed process of forwarding data by a local eNB under a source macro eNB when the source macro eNB controls a UE to be handed over from the local eNB to an adjacent target eNB is as follows:

Operation 1101, the local eNB receives a Handover Indication message or a Data Forward Command message transmitted by the source macro eNB to instruct the UE to be handed over to the target eNB, where the control plane of the UE is connected with the source macro eNB, and the user plane of the UE is connected with the local eNB.

Particularly the Handover Indication message includes the identifier of the UE.

Particularly the Data Forward Command message carries at least an identifier of bearer for which data needs to be forwarded and additionally the identifier of the UE, a transport layer address and a TEID of a forward tunnel, etc.

Operation 1102, the local eNB transmits a sequence number status report to the source macro eNB, so that the source macro eNB obtains and transmits to the target eNB, sequence number transmission status information of uplink and downlink PDCP data packets of the UE from the sequence number status report.

Preferably the local eNB stops uplink and downlink data of the UE from being received and transmitted upon reception of the Handover Indication message or the Data Forward Command message transmitted by the source macro eNB.

A particular process in which the UE is handed over from the local eNB served by the source macro eNB to the adjacent eNB in the embodiments above of the invention will be described below in details in connection with two particular embodiments.

Figure 12:
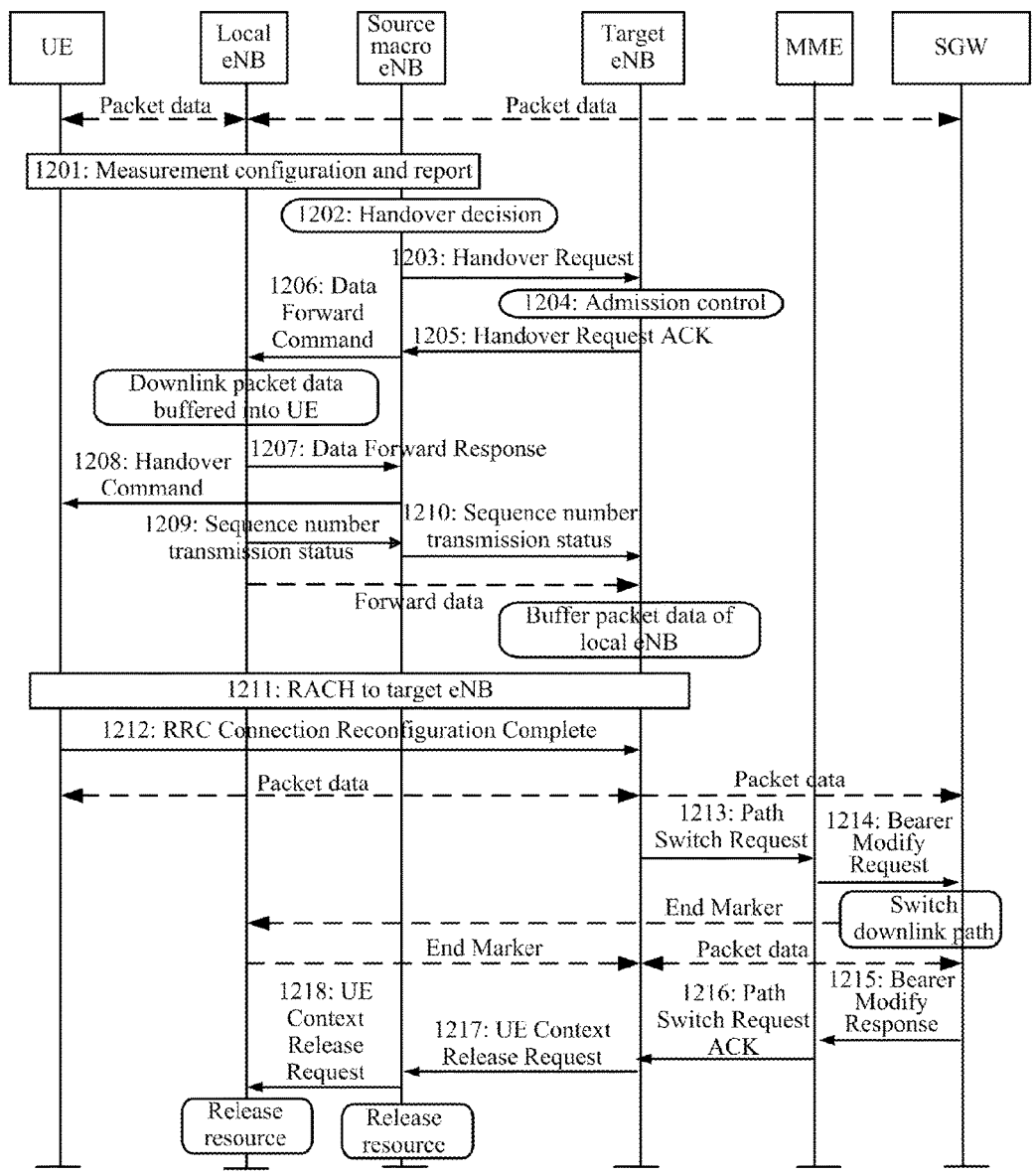
FIG. 12 is a flow chart of a method according to a first particular embodiment of the invention.

In a first particular embodiment, as illustrated in FIG. 12, a particular process in which the UE is handed over from the local eNB under the source macro eNB to the target eNB, in the network architecture where the control plane is separated from the user plane, as illustrated in FIG. 4 is as follows:

Operation 1201, the source macro eNB configures the UE with measurement configuration information for the UE to perform a measurement according to the measurement configuration information, and the UE reports a measurement result to the source eNB to assist the source eNB in making a handover decision.

Operation 1202, the source macro eNB makes a handover decision.

Operation 1203, the source macro eNB transmits a Handover Request message, which includes handover preparation related information, to the target eNB after deciding a handover to be performed.

Operation 1204, the target eNB makes an admission decision according to QoS information of bearers to be admitted, by referring to the Handover Request message, and performs underlying configuration to prepare for the handover upon determining that an admission of the UE is allowed.

Operation 1205, the target eNB returns a Handover Request Acknowledgement to the source macro eNB.

Operation 1206, the source macro eNB transmits a Data Forward Command to the local eNB which sets up a user plane connection with the UE, the Data Forward Command carries at least bearer information about EPS Radio Access Bearers (E-RABs) for which data needs to be forwarded and the identifier of the UE, and the bearer information about the E-RABs includes the identifiers (IDs) of the bearers, a transport layer address and a tunnel TEID of a downlink forward tunnel, and a transport layer address and a tunnel TEID of an uplink forward tunnel Preferably the source macro eNB may transmit only information about bearers in the local eNB, among the E-RABs, for which data needs to be forwarded, to the local eNB, and the identifier of the UE is an identifier for distinguishing the UE between the local eNB and the source macro eNB, which can be an identifier allocated by the source macro eNB for the UE over a control plane interface between the local eNB and the source macro eNB before the UE is handed over, and which can be used directly in the Data Forward Command.

Operation 1207, the local macro eNB returns a Data Forward Response message to the source macro eNB.

Operation 1208, the source macro eNB can transmit a Handover Command to the UE upon reception of the Data Forward Response message (or this operation may be omitted but the source macro eNB can decide when to transmit a Handover Command).

Operation 1209, the local eNB transmits, to the source macro eNB, sequence number transmission status information of current data, the sequence number transmission status information carries at least sequence numbers of downlink data packets which have not been transmitted successfully, the first sequence number which can be allocated by the target eNB, etc., and further the identifier which can distinguish the UE between the local eNB and the source macro eNB.

Operation 1210, the source macro eNB converts the identifier of the UE in the sequence number transmission status information into an X2 interface application layer identifier, allocated by the source macro eNB and the target eNB in a handover preparation phase, according to the previously received Data Forward Response message, and if the UE sets up a part of user plane connections with the source macro eNB, then the source macro eNB can further add, and transmit to the target eNB, sequence number transmission status information of the user plane managed by the source eNB, in the sequence number transmission status information.

Operation 1211, the UE performs uplink synchronization with the target eNB and accesses randomly a target cell served by the target eNB.

Operation 1212, the UE returns an RRC Connection Reconfiguration Complete message to the target eNB.

Operation 1213, the target eNB initiates a Path Switch Request to the MME, which carries a user plane transport layer address and a downlink GTP tunnel endpoint identifier allocated by the target eNB for an EPS bearer of the respective UE.

Operation 1214, the MME initiates a Bearer Modify Request to the SGW and notifies the SGW of the user plane transport layer address and the downlink GTP tunnel endpoint identifier allocated by the target eNB for the EPS bearer of the respective UE, and the SGW performs path switching to switch a downlink data transmission path of the UE to the target eNB.

Operation 1215, the SGW returns a Modify Bearer Response to the MME, the Modify Bearer Response carries a user plane transport layer address and an uplink GTP tunnel endpoint identifier allocated by the SGW for the EPS bearer of the respective UE.

Operation 1216, the MME returns a Path Switch Request Acknowledge to the target eNB, the Path Switch Request Acknowledge carries the user plane transport layer address and the uplink GTP tunnel endpoint identifier allocated by the SGW for the EPS bearer of the respective UE.

Thus the path switching process has been completed, and thereafter downlink data of the UE is transmitted as follows: the SGW transmits the data packet to the corresponding user plane transport layer address specified by the target eNB over the bearer serving the SGW and sets a downlink GTP tunnel endpoint identifier; and for an uplink data packet transmitted by the UE, the target eNB transmits the data packet to the corresponding user plane transport layer address specified by the SGW over the bearer serving the target eNB and sets an uplink GTP tunnel endpoint identifier.

Operation 1217, the target eNB transmits a UE Context Release request to the source macro eNB, and the source macro eNB releases the related resource.

Operation 1218, the source macro eNB transmits a UE Context Release request to the local eNB, and the local eNB releases the related resource.

Figure 13:
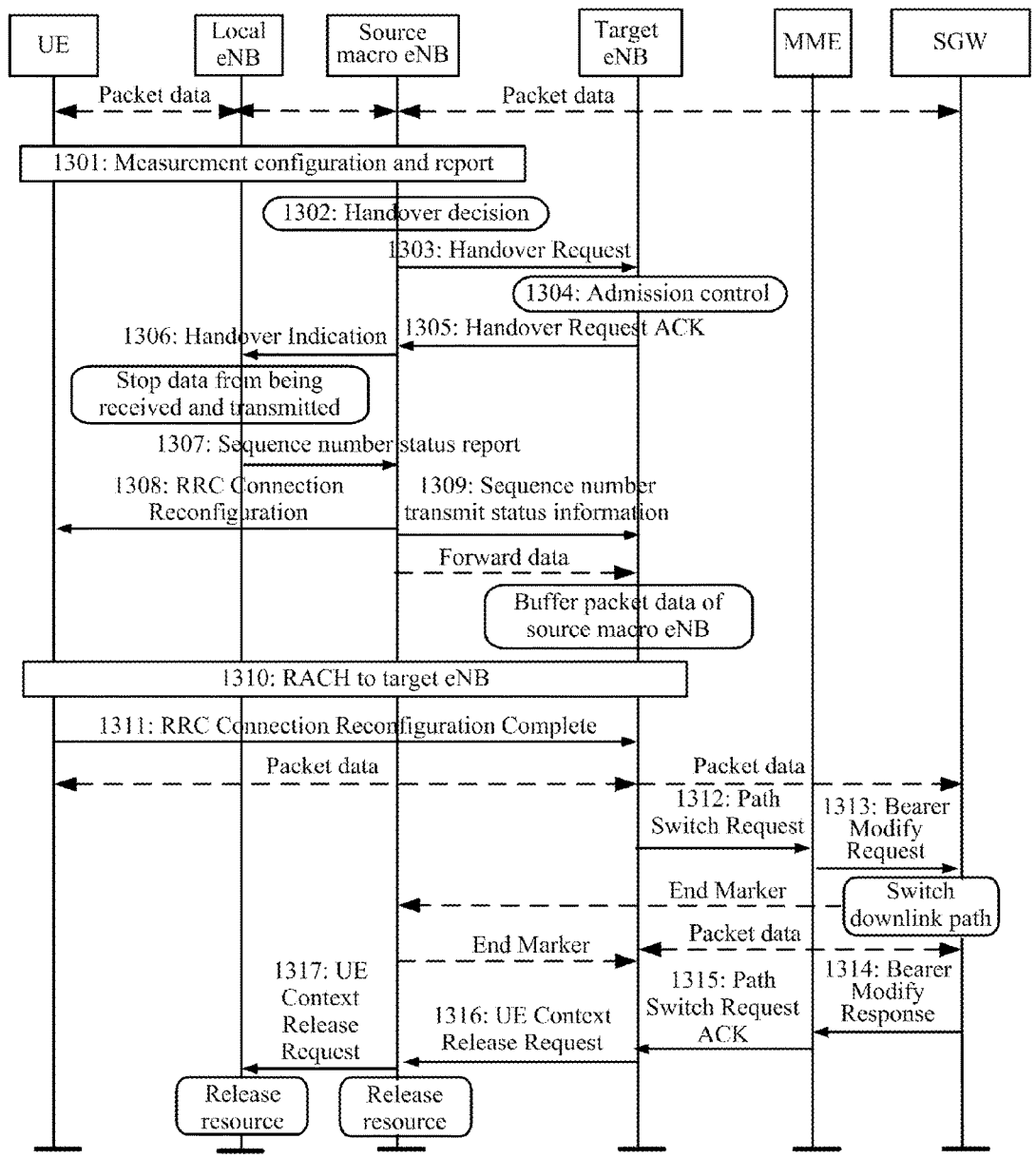
FIG. 13 is a flow chart of a method according to a second particular embodiment of the invention.

In a second particular embodiment, as illustrated in FIG. 13, a particular process in which the UE is handed over from the local eNB under the source macro eNB to the target eNB, in the network architecture where the control plane is separated from the user plane, as illustrated in FIG. 6 is as follows:

Operation 1301, the source macro eNB configures the UE with measurement configuration information for the UE to perform a measurement according to the measurement configuration information, and the UE reports a measurement result to the source eNB to assist the source eNB in making a handover decision.

Operation 1302, the source macro eNB makes a handover decision.

Operation 1303, the source macro eNB transmits a Handover Request message, which includes handover preparation related information, to the target eNB after deciding a handover to be performed.

Operation 1304, the target eNB makes an admission decision according to QoS information of bearers to be admitted, by referring to the Handover Request message, and performs underlying configuration to prepare for the handover upon determining that an admission of the UE is allowed.

Operation 1305, the target eNB returns a Handover Request Acknowledgement to the source macro eNB.

Operation 1306, the source macro eNB transmits a Handover Indication message to the local eNB which sets up a user plane connection with the UE, the message carries at least an identifier, capable of distinguishing the UE between the local eNB and the source macro eNB, which can be an identifier allocated by the source macro eNB for the UE over a control plane interface between the local eNB and the source macro eNB before the UE is handed over, and the identifier can be used directly in the Handover Indication message. The local eNB stops to transmit downlink data to the UE and stops to schedule the UE to transmit uplink data upon reception of the Handover Indication message.

Operation 1307, the local eNB transmits a Sequence Number (SN) status report, which carries transmission and acknowledgment status information of downlink RLC to the source macro eNB.

Operation 1308, the source macro eNB transmits an RRC Connection Reconfigure message to the UE.

Operation 1309, the source macro eNB transmits sequence number transmission status information of current data determined from the sequence number status report to the target eNB.

Operation 1310, the UE performs uplink synchronization with the target eNB and accesses randomly a target cell served by the target eNB.

Operation 1311, the UE returns an RRC Connection Reconfiguration Complete message to the target eNB.

Operation 1312, the target eNB initiates a Path Switch Request to the MME, which carries a user plane transport layer address and a downlink GTP tunnel endpoint identifier allocated by the target eNB for an EPS bearer of the respective UE.

Operation 1313, the MME initiates a Bearer Modify Request to the SGW and notifies the SGW of the user plane transport layer address and the downlink GTP tunnel endpoint identifier allocated by the target eNB for the EPS bearer of the respective UE, and the SGW performs path switching to switch a downlink data transmission path of the UE to the target eNB.

Operation 1314, the SGW returns a Modify Bearer Response to the MME, the Modify Bearer Response carries a user plane transport layer address and an uplink GTP tunnel endpoint identifier allocated by the SGW for the EPS bearer of the respective UE.

Operation 1315, the MME returns a Path Switch Request Acknowledge to the target eNB, the Path Switch Request Acknowledge carries the user plane transport layer address and the uplink GTP tunnel endpoint identifier allocated by the SGW for the EPS bearer of the respective UE.

Operation 1316, the target eNB transmits a UE Context Release request to the source macro eNB, and the source macro eNB releases the related resource.

Operation 1317, the source macro eNB transmits a UE Context Release request to the local eNB, and the local eNB releases the related resource.

Figure 14A:
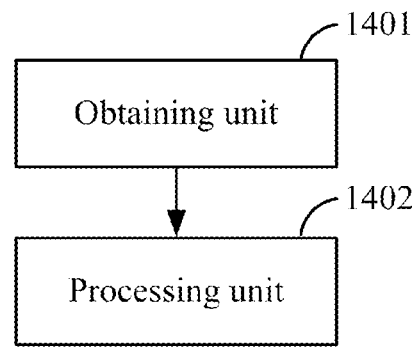
FIG. 14A is a schematic functionally-structural diagram of a network-side device according to an embodiment of the invention.

Based upon the same inventive idea, as illustrated in FIG. 14A, an embodiment of the invention further provides a network-side device, and reference can be made to the implementation of the source macro eNB in the first embodiment above for an implementation of the network-side device, so a repeated description thereof will be omitted here, and the network-side device generally includes the following units:

An obtaining unit 1401 is configured to obtain sequence number transmission status information of uplink and downlink PDCP data packets of a local eNB currently accessed by a UE, where the control plane of the UE is connected with the network-side device, and the user plane of the UE is connected with the local eNB; and A processing unit 1402 is configured to transmit the sequence number transmission status information to a target eNB to which the UE is to be handed over, so that the target eNB sets up a user plane connection with the UE according to the sequence number transmission status information.

Particularly the obtaining unit 1401 is configured:

To obtain the sequence number transmission status information from a sequence number status report transmitted by the local eNB;

Or

To obtain the sequence number transmission status information from data packets, for which no acknowledgement indicator of successful transmission is available from the local eNB, among locally stored PDCP data packets.

In a particular implementation, the obtaining unit 1401 is further configured to receive the sequence number status report transmitted by the local eNB after transmitting a Data Forward Command message to the local eNB.

In another particular implementation, the obtaining unit 1401 is further configured to receive the sequence number status report transmitted by the local eNB after transmitting a Handover Indication message to the local eNB.

In another particular implementation, the obtaining unit 1401 is further configured to transmit a Handover Indication message to the local eNB before obtaining the sequence number transmission status information from the data packets, for which no acknowledgement indicator of successful transmission is available from the local eNB, among the locally stored PDCP data packets.

Figure 14B:
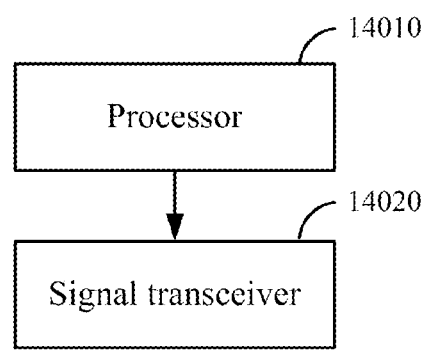
FIG. 14B is a schematic physically-structural diagram of the network-side device according to the embodiment of the invention.

Particularly in hardware structure, the obtaining unit 1401 can be a processor, and the processing unit 1402 can be a signal transceiver including transmit and receive antennas, etc., and at this time, as illustrated in FIG. 14B, the network-side device according to the embodiment of the invention includes:

An processor 14010 is configured to obtain sequence number transmission status information of uplink and downlink PDCP data packets of a local eNB currently accessed by a UE, where the control plane of the UE is connected with the network-side device, and the user plane of the UE is connected with the local eNB; and A signal transceiver 14020 is configured to transmit the sequence number transmission status information to a target eNB to which the UE is to be handed over, so that the target eNB sets up a user plane connection with the UE according to the sequence number transmission status information.

Particularly the processor 14010 is configured:

To obtain the sequence number transmission status information from a sequence number status report transmitted by the local eNB;

Or

To obtain the sequence number transmission status information from data packets, for which no acknowledgement indicator of successful transmission is available from the local eNB, among locally stored PDCP data packets.

In a particular implementation, the processor 14010 is further configured to receive the sequence number status report transmitted by the local eNB after transmitting a Data Forward Command message to the local eNB.

In another particular implementation, the processor 14010 is further configured to receive the sequence number status report transmitted by the local eNB after transmitting a Handover Indication message to the local eNB.

In another particular implementation, the processor 14010 is further configured to transmit a Handover Indication message to the local eNB before obtaining the sequence number transmission status information from the data packets, for which no acknowledgement indicator of successful transmission is available from the local eNB, among the locally stored PDCP data packets.

Figure 15A:
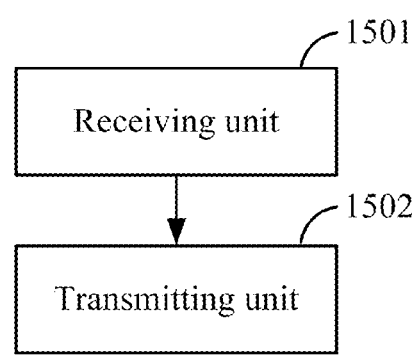
FIG. 15A is a schematic functionally-structural diagram of another network-side device according to an embodiment of the invention.

Based upon the same inventive idea, as illustrated in FIG. 15A, an embodiment of the invention further provides a network-side device, and reference can be made to the implementation of the local eNB in the second embodiment above for an implementation of the network-side device, so a repeated description thereof will be omitted here, and the network-side device generally includes the following units:

A receiving unit 1501 is configured to receive a Handover Indication message transmitted by a source macro eNB to instruct a UE to be handed over to a target eNB, where the control plane of the UE is connected with the source macro eNB, and the user plane of the UE is connected with the network-side device; and A transmitting unit 1502 is configured to transmit an acknowledgement information of successful transmission of PDCP data packets to the source macro eNB so that the source macro eNB obtains, and transmits to the target eNB, sequence number transmission status information of uplink and downlink PDCP data packets of the UE from data packets, for which no acknowledgement indicator of successful transmission is available from the local eNB, among locally stored PDCP data packets according to the acknowledgement information of successful transmission status.

Particularly the receiving unit 1501 is further configured to stop uplink and downlink data of the UE from being received and transmitted upon reception of the Handover Indication message.

Figure 15B:
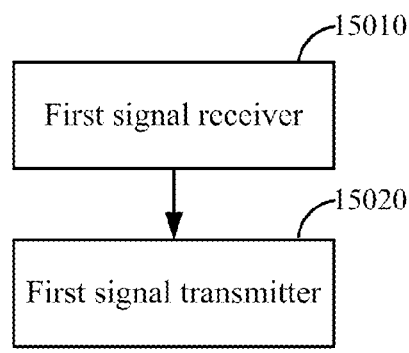
FIG. 15B is a schematic physically-structural diagram of the another network-side device according to the embodiment of the invention.

Particularly in hardware structure, the receiving unit 1501 can be a signal receiver including a receive antenna, etc., and the transmitting unit 1502 can be a signal transmitter including a transmit antenna, etc., and at this time, as illustrated in FIG. 15B, the network-side device according to the embodiment of the invention includes:

A first signal receiver 15010 is configured to receive a Handover Indication message transmitted by a source macro eNB to instruct a UE to be handed over to a target eNB, where the control plane of the UE is connected with the source macro eNB, and the user plane of the UE is connected with the network-side device; and A first signal transmitter 15020 is configured to transmit acknowledgement information of successful transmission of PDCP data packets to the source macro eNB so that the source macro eNB obtains, and transmits to the target eNB, sequence number transmission status information of uplink and downlink PDCP data packets of the UE from data packets, for which no acknowledgement indicator of successful transmission is available from the local eNB, among locally stored PDCP data packets according to the acknowledgement information of successful transmission.

Particularly the first signal receiver 15010 is further configured to stop uplink and downlink data of the UE from being received and transmitted upon reception of the Handover Indication message.

Figure 16A:
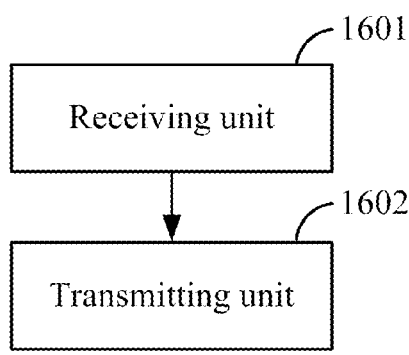
FIG. 16A is a schematic functionally-structural diagram of another network-side device according to an embodiment of the invention.

Based upon the same inventive idea, as illustrated in FIG. 16A, an embodiment of the invention further provides a network-side device, and reference can be made to the implementation of the local eNB in the third embodiment above for an implementation of the network-side device, so a repeated description thereof will be omitted here, and the network-side device generally includes the following units:

A receiving unit 1601 is configured to receive a Handover Indication message or a Data Forward Command message transmitted by a source macro eNB to instruct a UE to be handed over to a target eNB, where the control plane of the UE is connected with the source macro eNB, and the user plane of the UE is connected with the network-side device; and A transmitting unit 1602 is configured to transmit a sequence number status report to the source macro eNB so that the source macro eNB obtains, and transmits to the target eNB, sequence number transmission status information of uplink and downlink PDCP data packets of the UE from the sequence number status report.

Particularly the receiving unit 1601 is further configured to stop uplink and downlink data of the UE from being received and transmitted upon reception of the Handover Indication message or the Data Forward Command message transmitted by the source macro eNB.

Figure 16B:
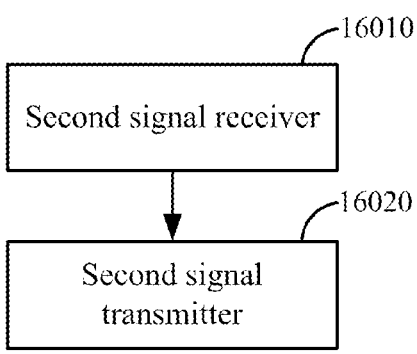
FIG. 16B is a schematic physically-structural diagram of the another network-side device according to the embodiment of the invention.

Particularly in hardware structure, the receiving unit 1601 can be a signal receiver including a receive antenna, etc., and the transmitting unit 1602 can be a signal transmitter including a transmit antenna, etc., and at this time, as illustrated in FIG. 16B, the network-side device according to the embodiment of the invention includes:

A second signal receiver 16010 is configured to receive a Handover Indication message or a Data Forward Command message transmitted by a source macro eNB to instruct a UE to be handed over to a target eNB, where the control plane of the UE is connected with the source macro eNB, and the user plane is connected with the network-side device; and A signal transmitter 16020 is configured to transmit a sequence number status report to the source macro eNB so that the source macro eNB obtains, and transmits to the target eNB, sequence number transmission status information of uplink and downlink PDCP data packets of the UE from the sequence number status report.

Particularly the second signal receiver 16010 is further configured to stop uplink and downlink data of the UE from being received and transmitted upon reception of the Handover Indication message or the Data Forward Command message transmitted by the source macro eNB.

With the technical solutions above, in the embodiments of the invention, the control plane of a UE is connected with a source macro eNB, and the user plane of the UE is connected with a local eNB, so that a risk of interrupted communication of the UE being handed over in the existing layered network can be lowered effectively. Moreover the source macro eNB obtains sequence number transmission status information of uplink and downlink PDCP data packets of the local eNB currently accessed by the UE and transmits the sequence number transmission status information to a target eNB to which the UE is to be handed over, and the target eNB sets up a user plane connection with the UE according to the sequence number transmission status data, so that the user plane connection of the UE can be switched from the local eNB to the adjacent target eNB and data can be avoided from being lost during the handover.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for forwarding data, wherein the method comprises:

obtaining, by a source macro base station, sequence number transmission status information of uplink and downlink Packet Data Convergence Protocol (PDCP) data packets of a source local base station currently accessed by a User Equipment (UE), wherein a control plane of the UE is only connected with the source macro base station, a user plane of the UE is connected with the source local base station, and all or a part of bearers of the user plane of the UE are separated from all bearers of the control plane of the UE; and transmitting, by the source macro base station, the sequence number transmission status information to a target base station to which a handover of the UE is to be effectuated from the source macro base station to enable the target base station to set up a user plane connection with the UE according to the sequence number transmission status information such that the UE is connected with the target base station through at least one of the bearers of the user plane and is connected with the source local base station after the handover and such that the control plane of the UE is only connected with the target base station after the handover, the target base station is a macro base station providing underlying coverage in another layered network adjacent to the source macro base station, or a base station in another non-layered network;

wherein obtaining, by the source macro base station, the sequence number transmission status information of uplink and downlink PDCP data packets of the source local base station currently accessed by the UE comprises:

obtaining, by the source macro base station, the sequence number transmission status information according to a sequence number status report transmitted by the source local base station;

or obtaining, by the source macro base station, the sequence number transmission status information from the PDCP data packets, for which no acknowledgement indicator of successful transmission is available from the source local base station, among PDCP data packets locally stored in the macro source base station.

2. The method according to claim 1, wherein before the source macro base station obtains the sequence number transmission status information from the sequence number status report transmitted by the source local base station, the method further comprises:

receiving, by the source macro base station, the sequence number status report transmitted by the source local base station after transmitting a Data Forward Command message to the source local base station, the Data Forward Command message carries an identifier of bearer for which data needs to be forwarded, an identifier of the UE, and a transport layer address and a Tunnel Endpoint Identifier (TED) of a forward tunnel.

3. The method according to claim 2, wherein after the source macro base station transmits the Data Forward Command message to the source local base station, the method further comprises:

stopping, by the source local base station, uplink and downlink data of the UE from being received and transmitted.

4. The method according to claim 1, wherein before the source macro base station obtains the sequence number transmission status information from the sequence number status report transmitted by the source local base station, the method further comprises:

receiving, by the source macro base station, the sequence number status report transmitted by the source local base station after transmitting a Handover Indication message to the source local base station.

5. The method according to claim 4, wherein the Handover Indication message comprises an identifier of the UE.

6. The method according to claim 1, wherein before the source macro base station obtains the sequence number transmission status information from the PDCP data packets, for which no acknowledgement indicator of successful transmission is available from the source local base station, among the PDCP data packets locally stored in the source macro base station, the method further comprises:

transmitting, by the source macro base station, a Handover Indication message to the source local base station.

7. The method according to claim 6, wherein after the source macro base station transmits the Handover Indication message to the source local base station, the method further comprises:

stopping, by the source local base station, uplink and downlink data of the UE from being received and transmitted.

8. A method for forwarding data, wherein the method comprises:

receiving, by a source local base station, a Handover Indication message transmitted by a source macro base station to instruct a User Equipment (UE) to be handed over to a target base station, wherein a control plane of the UE is only connected with the source macro base station, a user plane of the UE is connected with the source local base station, and all or a part of bearers of the user plane of the UE are separated from all bearers of the control plane of the UE; and transmitting, by the source local base station, acknowledgement information of successful transmission of Packet Data Convergence Protocol (PDCP) data packets to the source macro base station, so that the source macro base station obtains and transmits to the target base station, sequence number transmission status information of uplink and downlink PDCP data packets of the UE from the PDCP data packets, for which no acknowledgement indicator of successful transmission is available from the source local base station, among PDCP data packets locally stored in the source macro base station according to the acknowledgement information of successful transmission, wherein the target base station is a macro base station providing underlying coverage in another layered network adjacent to the source macro base station, or a base station in another non-layered network.

9. The method according to claim 8, wherein after the source local base station receives the Handover Indication message, the method further comprises:

stopping, by the source local base station, uplink and downlink data of the UE from being received and transmitted.

10. A method for forwarding data, wherein the method comprises:

receiving, by a source local base station, a Handover Indication message or a Data Forward Command message transmitted by a source macro base station to instruct a User Equipment (UE) to be handed over to a target base station, wherein a control plane of the UE is only connected with the source macro base station, a user plane of the UE is connected with the source local base station, and all or a part of bearers of the user plane of the UE are separated from all bearers of the control plane of the UE; and transmitting, by the source local base station, a sequence number status report to the source macro base station, so that the source macro base station obtains and transmits to the target base station, sequence number transmission status information of uplink and downlink Packet Data Convergence Protocol (PDCP) data packets of the UE from the sequence number status report, wherein the target base station is a macro base station providing underlying coverage in another layered network adjacent to the source macro base station, or a base station in another non-layered network.

11. The method according to claim 10, wherein the Data Forward Command message carries an identifier of bearer for which data needs to be forwarded, an identifier of the UE, and a transport layer address and a Tunnel Endpoint Identifier (TED) of a forward tunnel.

12. The method according to claim 10, wherein after the source local base station receives the Handover Indication message or the Data Forward Command message transmitted by the source macro base station, the method further comprises:
stopping, by the source local base station, uplink and downlink data of the UE from being received and transmitted.

13. A network-side device, comprising:
a processor configured to obtain sequence number transmission status information of uplink and downlink Packet Data Convergence Protocol (PDCP) data packets of a source local base station currently accessed by a User Equipment (UE), wherein a control plane of the UE is only connected with the network-side device, a user plane of the UE is connected with the source local base station, and all or a part of bearers of the user plane of the UE are separated from all bearers of the control plane of the UE; and
a signal transceiver configured to transmit the sequence number transmission status information to a target base station to which the UE is to be handed over, so that the target base station sets up a user plane connection with the UE according to the sequence number transmission status information, wherein the target base station is a macro base station providing underlying coverage in another layered network adjacent to the network-side device, or a base station in another non-layered network;
wherein the processor is further configured:
to obtain the sequence number transmission status information from a sequence number status report transmitted by the source local base station;
or
to obtain the sequence number transmission status information from the PDCP data packets, for which no acknowledgement indicator of successful transmission is available from the source local base station, among PDCP data packets locally stored in the network-side device.

14. The network-side device according to claim 13, wherein the processor is further configured to receive the sequence number status report transmitted by the source local base station after transmitting a Data Forward Command message to the source local base station.

15. The network-side device according to claim 13, wherein the processor is further configured to receive the sequence number status report transmitted by the source local base station after transmitting a Handover Indication message to the source local base station.

16. The network-side device according to claim 13, wherein the processor is further configured to transmit a Handover Indication message to the source local base station before obtaining the sequence number transmission status information from the PDCP data packets, for which no acknowledgement indicator of successful transmission is available from the source local base station, among the PDCP data packets locally stored in the network-side device.

* * * * *